United States Patent [19]

Ono et al.

[11] Patent Number: 5,962,058
[45] Date of Patent: Oct. 5, 1999

[54] FOAMABLE OIL-IN-WATER EMULSION

[75] Inventors: Shigeyuki Ono; Yoshihiro Konishi; Kiyoshi Kataoka, all of Ibaraki, Japan

[73] Assignee: Kao Corporation, Tokyo, Japan

[21] Appl. No.: 08/514,631

[22] Filed: Aug. 14, 1995

[30] Foreign Application Priority Data

Aug. 12, 1994 [JP] Japan ................................. 6-212111
Mar. 28, 1995 [JP] Japan ................................. 7-069072

[51] Int. Cl.⁶ ....................................................... A23D 7/00
[52] U.S. Cl. ......................... 426/564; 426/570; 426/602; 426/604
[58] Field of Search .................................. 426/602, 604, 426/564, 570

[56] References Cited

U.S. PATENT DOCUMENTS

| 4,284,655 | 8/1981 | Miller | 426/602 |
| 4,966,779 | 10/1990 | Kerk | 426/602 |
| 5,160,759 | 11/1992 | Nomura | 426/602 |

FOREIGN PATENT DOCUMENTS 4-88944  3/1992  Japan .

OTHER PUBLICATIONS

Swern 1979 Baileys Industrial Oil and Fat Products vol. 1, 4th ed J Wiley & Sons New York pp. 19,27,413–418.

*Primary Examiner*—Carolyn Paden
*Attorney, Agent, or Firm*—Oblon, Spivak, McClelland, Maier & Neustadt, P.C.

[57] ABSTRACT

A sweetened foamable oil-in-water emulsion capable of giving a whipped cream with improved heat resistance and melting behavior in mouth, which comprises a triglyceride, a glycerol di(saturated fatty acid) ester of which saturated fatty acid moieties have from 12 to 22 carbon atoms, a protein, an emulsifier, water, and at least one member selected from the group consisting of a sugar and a sugar alcohol, and consists of, based on the total weight of the emulsion, from 3 to 50% by weight of an oily phase and from 50 to 97% by weight of an aqueous phase, in which the oily phase comprises the triglyceride and from 1 to 50% by weight, based on the total weight of the oily phase, of the glycerol di(saturated fatty acid) ester, and the aqueous phase comprises 10% by weight or more, based on the total weight of the aqueous phase, of at least one member selected from the group consisting of a sugar and a sugar alcohol.

12 Claims, No Drawings

FOAMABLE OIL-IN-WATER EMULSION

CROSS-REFERENCE TO RELATED APPLICATIONS

This application is based on Japanese Patent Application Nos. 6-212111, filed Aug. 12, 1994 and 7-69072, filed on Mar. 28, 1995, which are incorporated herein by reference in their entirety.

BACKGROUND OF THE INVENTION

1. Field of the Invention

The present invention relates to a sweetened foamable oil-in-water emulsion which is distributed and utilized also at ordinary temperatures (from 20 to 35° C.). More particularly, it relates to a sweetened foamable oil-in-water emulsion which is to be whipped up and used as toppings or fillings of cakes, sweet rolls, desserts, etc. and capable of giving a whipped cream improved particularly in the heat resistance and melting behavior in mouth.

2. DISCUSSION OF THE BACKGROUND

There have been developed a number of foamable emulsions (hereinafter sometimes referred to as foamable creams) which are whipped up and used as toppings or fillings of cakes, sweet rolls, desserts, etc. The properties to be required for these foamable creams are varied depending on the form of the product and distribution means (in a chilled state or at ordinary temperatures). Further, the characteristics to be required therefor, for example, whipping characteristics (over-run, whipping time) and physical properties (heat resistance and melting behavior of the whipped cream), are also varied.

As such foamable emulsions, there have been widely used water-in-oil emulsions and oil-in-water ones. Among them, water-in-oil emulsions, of which water activity (Aw) can be regulated to a low level, have been generally utilized since they are required to prolong their shelf lives in summer, when they are distributed at ordinary temperatures throughout the year. However, a water-in-oil emulsion comprises, as the continuous phase, an oily phase containing a fat or oil as the main component, which is generally apt to make the taste oily, whereas today's consumers prefer a fresh taste. In recent years, accordingly, there has been an increase in the demand for an oil-in-water emulsion as a substitute for a water-in-oil emulsion. In particular, it has been urgently required to develop a sweetened oil-in-water emulsion usually containing from 10 to 50% by weight of sugars which can be distributed and used at ordinary temperatures throughout the year. Unsweetened oil-in-water emulsions, which contain no or a little of sugars, are usually handled as a chilled product to be distributed at about 10° C., and sugars are added thereto in the step of whipping.

Examples of the sweetened oil-in-water emulsions include those described in U.S. Pat. Nos. 4,146,652 (published on Mar. 27, 1979), 4,234,611 (published on Nov. 18, 1980) and 4,390,550 (published on Jun. 28, 1983), of which the assignee is RICH PRODUCTS CORP. Properties indispensable to such a sweetened oil-in-water type emulsion as described above include not only fundamental properties, such as an emulsion stability and whipping characteristics, as a foamable emulsion, but also an excellent melting behavior in mouth and a good heat resistance of the whipped cream, that is, even when the whipped cream which is prepared by whipping an oil-in-water type emulsion is stored at ordinary temperatures, in particular, i the summer (about 30° C.) for a long time, it does not undergo loss in shape and separation of water but remains stable.

Oil-in-water emulsions-in the prior art contain a natural animal or vegetable fat (for example, rapeseed oil, soybean oil or those obtained by hardening them to a low extent) as a base fat or oil. There has been known that an extremely hardened product of the above-mentioned natural animal or vegetable fat is blended with the base fat or oil for improving heat resistance of such an oil-in-water emulsion. However, the addition of such a fat or oil generally causes an increase in the amount of fat (or oil) crystals and thus largely deteriorates the taste, e.g., melting behavior in mouth, which is derived from the base fat or oil. Also, attention is paid to the content of fat (or oil) crystals and emulsifiers in view of the improvement of the emulsion stability. Thus, there have been proposed methods for using a specific triglyceride and an emulsifier for improving the heat resistance of a cream prepared by whipping an oil-in-water emulsion. However, the proposed methods cannot give heat resistance at the desired level to a cream but merely make a cream resistant to a temperature of 20 to 25° C. Japanese Patent Publication-A No. 4-88944 (published on Apr. 23, 1992) has proposed an oil-in-water emulsion composition which contains 10% by weight or more and less than 30% by weight of a diglyceride in the oily phase. In this emulsion, a diglyceride containing an unsaturated fatty acid moiety as the fatty acid moiety is mainly used. The reason why such a diglyceride is used is to improve the milky taste and body.

SUMMARY OF THE INVENTION

Accordingly, it is one object of the present invention to provide a sweetened foamable oil-in-water emulsion which is capable of giving a whipped cream improved in the heat resistance and melting behavior in the mouth.

It is another object of the present invention to provide a foamable oil-in-water emulsion which is excellent in acid resistance while retaining the above-mentioned properties.

These and other objects, which will become apparent during the following detailed description, have been achieved by the inventors' discovery that when a glycerol di(saturated fatty acid) ester is added to the base fat or oil in an amount of from 1 to 50% by weight, based on the total weight of the oily phase, in the preparation of a sweetened oil-in-water emulsion, the cream which has been prepared by whipping the emulsion exhibits heat resistance of a desired level while retaining the inherent melting behaviors of the base fat or oil, which are physical properties reflecting on the melting behavior in the mouth.

The present inventors consider that the glycerol di(saturated fatty acid) ester added acts not only as a crystalline component which imparts heat resistance (heat stability) to fat spheres but also as a component which controls the crystalline state, to thereby achieve such properties.

Thus, the present invention relates to a foamable oil-in-water emulsion comprising (a) a triglyceride, (b) a glycerol di(saturated fatty acid) ester of the general formula:

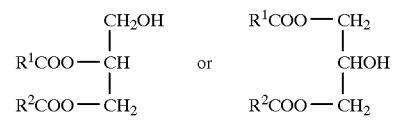

where $R^1COO-$ and $R^2COO-$ are the same or different from each other and each represents a saturated $C_{12-22}$ fatty acid moiety, (c) a protein, (d) an emulsifier, (e) water and (f) at least one member selected from the group consisting of a sugar and a sugar alcohol, the emulsion comprising an oily phase and an aqueous phase, the oily phase being from 3 to 50% by weight of the total weight of the emulsion and the aqueous phase being from 50 to 97% by weight of the total weight of the emulsion, the oily phase comprising (a) the triglyceride and from 1 to 50% by weight, based on the total weight of the oily phase, of (b) the glycerol di(saturated fatty acid) ester, and the aqueous phase comprising 10% by weight or more, based on the total weight of the aqueous phase, of (f) at least one member selected from the group consisting of a sugar and a sugar alcohol.

In other words, the present invention relates to a foamable oil-in-water emulsion containing a fat or oil, a protein, an emulsifier, a sugar and/or a sugar alcohol, and water; consisting of from 3 to 50% by weight of an oily phase containing a triglyceride(s) as the main component and from 50 to 97% by weight of an aqueous phase; and containing 10% by weight or more of the sugar and/or the sugar alcohol in the aqueous phase, characterized in that a glycerol di(fatty acid) ester, of which the constituting fatty acid moieties are saturated fatty acid moieties having from 12 to 22 carbon atoms, is contained in the oily phase in an amount of from 1 to 50% by weight.

Preferable embodiments of the present invention are as follows:

(1) the emulsion described above in which $R^1COO$— of each of the glycerol di(saturated fatty acid) ester(s) used is a saturated fatty acid moiety selected from the group consisting of palmitic acid moiety, stearic acid moiety, arachidic acid moiety and behenic acid moiety, and $R^2COO$— of each of the glycerol di(saturated fatty acid) ester(s) used is a saturated fatty acid moiety selected from the group consisting of palmitic acid moiety, stearic acid moiety, arachidic acid moiety and behenic acid moiety. That is, each of the glycerol di(saturated fatty acid) ester(s) used has one or two kind(s) of fatty acid moiety(s) selected from among palmitic acid moiety, stearic acid moiety, arachidic acid moiety and behenic acid moiety], (2) the emulsion described above in which a part of the $R^1COO$—(s) and the $R^2COO$—(s) constituting the glycerol di(saturated fatty acid) ester(s) used is a saturated fatty acid moiety(s) selected from the group consisting of palmitic acid moiety, stearic acid moiety, arachidic acid moiety and behenic acid moiety, which is present in an amount of 60% by weight or more and less than 100% by weight based on the entire saturated fatty acid moieties, (3) the emulsion described above in which whole or a part of of the $R^1COO$—(s) and the $R^2COO$—(s) constituting the glycerol di(saturated fatty acid) ester(s) used is behenic acid moiety, which is present in an amount of from 50 to 100% by weight based on the entire saturated fatty acid moieties, (4) the emulsion described above which contains the triglyceride(s) in an amount of from 3 to 50% by weight based on the total weight of the emulsion, and (5) the emulsion described above which comprises, based on the total weight of the aqueous phase, from 10 to 50% by weight of at least one member selected from the group consisting of a sugar and a sugar alcohol.

Now, the foamable oil-in-water emulsion of the present invention will be described.

DETAILED DESCRIPTION OF THE INVENTION

First, the glycerol di(saturated fatty acid) ester to be used in the present invention (hereinafter sometimes referred to as the diglyceride) will be illustrated in detail.

The glycerol di(saturated fatty acid) ester to be used in the present invention has saturated fatty acid moieties each having from 12 to 22 carbon atoms as the constituting fatty acid moieties (i.e., as the constituting fatty acid residues). Examples of the saturated fatty acid moieties having from 12 to 22 carbon atoms include lauric acid moiety, myristic acid moiety, palmitic acid moiety, stearic acid moiety, arachidic acid moiety and behenic acid moiety.

In the present invention, it is preferable to use a diglyceride(s) of which the constituting fatty acid moieties are selected from the group consisting of palmitic acid moiety, stearic acid moiety, arachidic acid moiety and behenic acid moiety. That is, it is preferable that every diglyceride has fatty acid moieties selected from the group consisting of palmitic acid moiety, stearic acid moiety, arachidic acid moiety and behenic acid moiety.

Further, the diglyceride(s) to be used in the present invention contains, in its(their) molecule, at least one member selected from the group consisting of saturated fatty acid moieties having from 16 to 22 carbon atoms (i.e., palmitic acid moiety, stearic acid moiety, arachidic acid moiety and behenic acid moiety) in an amount of preferably 60% by weight or more and less than 100% by weight, still more preferably 70% by weight or more and less than 100% by weight, and particularly preferably 80% by weight or more and less than 100% by weight, based on the entire saturated fatty acid moieties thereof.

That is, based on the total weight of the entire saturated fatty acid moieties of the diglyceride(s) used, the total weight of the saturated fatty acid moieties having from 16 to 22 carbon atoms amounts preferably 60% by weight or more.

Still more preferable diglyceride(s) contains, in its(their) molecule, behenic acid moiety (carbon atom number: 22) preferably in an amount of 50% by weight or more and still more preferably in an amount of 55% by weight or more based on the entire saturated fatty acid moieties thereof. Every diglyceride may be glycerol di(behenic acid) ester.

The diglyceride to be used in the present invention can be obtained by, for example, effecting transesterification between at least one member selected from the group consisting of fats and oils containing, as the main component, a triglyceride(s) having saturated fatty acid moieties carrying from 12 to 22 carbon atoms (for example, coconut oil, palm kernel oil or hardened high-erucic acid rapeseed oil), and glycerol in the presence of an alkali metal or alkaline earth metal hydroxide. Alternatively, it can also be obtained by reacting a fatty acid mixture containing a large amount of saturated fatty acids having from 12 to 22 carbon atoms with glycerol (an esterification reaction).

The diglyceride can also be synthesized with the use of an enzyme. When the reaction is effected under mild conditions with the use of an enzyme such as 1,3-position selective lipase, a diglyceride having an excellent flavor can preferably be obtained.

It is not industrially advantageous to separate the desired diglyceride alone from a reaction mixture. In the present invention, a mixture comprising a diglyceride(s) with a monoglyceride(s) and/or a triglyceride(s) may also be used. In such a case, however, it is desirable to use a mixture containing a desired diglyceride(s) in an amount of 50% by weight or more, preferably 70% by weight or more and still more preferably 80% by weight or more based on the total weight of the glycerides contained in the mixture. The monoglycerides formed as by-products can be eliminated from the reaction mixture with the use of a separation technique such as molecular distillation and chromatography.

The glycerol di(saturated fatty acid) ester according to the present invention is used in an amount of from 1 to 50% by weight, preferably from 2 to 45% by weight and still more preferably from 5 to 40% by weight based on the total weight of the oily phase of the foamable oil-in-water emulsion. When the amount of the glycerol di(saturated fatty acid) ester is 1% by weight or less, no sufficient effect can be achieved. On the other hand, when the amount of the glycerol di(saturated fatty acid) ester is 50% by weight or more, the feeling of a whipped cream during eating thereof (e.g., melting behavior in mouth) is seriously deteriorated.

The foamable oil-in-water emulsion of the present invention may be the same as the conventional ones in constitution except that a specific glycerol di(saturated fatty acid) ester as described above is employed as one component of the oily phase of the emulsion. More specifically, the foamable oil-in-water emulsion of the present invention contains a triglyceride, a specific glycerol di(saturated fatty acid) ester, a protein, an emulsifier, water, and a sugar and/or a sugar alcohol as essential components, optionally together with a stabilizer, a flavor, an essence, a thickener, etc.

In the oily phase of the foamable oil-in-water emulsion of the present invention, a triglyceride(s) is(are) also contained. The triglyceride(s) is(are) contained in the oily phase in an amount of generally from 3 to 50% by weight and preferably from 10 to 45% by weight based on the total weight of the emulsion. The triglyceride(s) is(are) introduced into the foamable oil-in-water emulsion of the present invention as the main component of an edible fat or oil, and/or, as the by-product of the diglyceride according to the present invention.

To introduce a triglyceride to the emulsion of the present invention, an edible fat or oil is employed. Examples of the edible fats and oils to be used in the present invention include vegetable fats and oils and milk fat, and those obtained by fractionating, hardening or transesterifying the same. Use may be made of only one fat or oil, or a mixture comprising two or more fats or oils. Specific examples of the vegetable fats and oils include soybean oil, palm oil, palm kernel oil and coconut oil. Among these fats and oils, a random-transesterified product of hardened palm kernel oil and hardened palm oil, for example, are preferable, since they are highly compatible with the glycerol di(saturated fatty acid) ester according to the present invention and exhibit sharp behaviors in fusion (or melting) thereof, and since a cream prepared with the oil exhibits an excellent melting behavior in mouth. It is preferable that the fat or oil employed herein has an iodine value of about 2.

Examples of the proteins to be used in the present invention include casein, whey protein, skimmilk powder, whole milk powder, milk protein and soybean protein. Also, milk protein salts such as potassium caseinate may be used therefor in the present invention. Furthermore, protein-containing materials for foodstuffs, such as cow's milk, raw milk and sweetened and condensed milk, are also usable therefor. The emulsion of the present invention contains a protein(s) in an amount of usually from 1 to 10% by weight based on the total weight of the emulsion.

Examples of the emulsifiers to be used in the present invention include monoglycerides of organic acids such as citric acid and lactic acid, glycerol fatty acid esters, polyglycerol fatty acid esters, sucrose fatty acid esters, sorbitan fatty acid esters, lecithins and propylene glycol fatty acid esters. From among these emulsifiers, hydrophilic ones are added to the aqueous phase, while lipophilic ones are added to the oily phase. The emulsifiers may be used either alone or by suitably combining two or more of them. The emulsion of the present invention contains an emulsifier(s) in an amount of usually from 0.1 to 1.0% by weight based on the total weight of the emulsion.

Examples of the sugars to be used in the present invention include glucose, lactose, maltose and sucrose. Examples of the sugar alcohols include sorbitol, maltitol, mannitol and xylitol. In the present invention, at least one member selected from the group consisting of sugars and sugar alcohols may be used in an amount of 10% by weight or more, usually from 10 to 50% by weight or more and preferably from 20 to 50% by weight based on the total weight of the aqueous phase of the emulsion according to the present invention.

As the stabilizers which are added if desired, for examples, an alkali metal phosphate (hexameta-phosphate, secondary phosphate, etc.) or citrate, or gum such as guar gum can be used.

Examples of the flavors include milk flavor and vanillin flavor, while that of the essence includes vanillin essence.

The foamable oil-in-water emulsion of the present invention can be produced by a conventional method with the use of the above-mentioned components. For example, it can be prepared by heating oily components (i.e., the oily phase) comprising an edible fat or oil (of which main component is a triglyceride), the glycerol di(saturated fatty acid) ester according to the present invention and an emulsifier and aqueous components (i.e., the aqueous phase) comprising water, a protein, a sugar and an emulsifier each to an appropriate temperature, and then mixing these phases together to pre-emulsify, followed by subjecting the pre-emulsified product thus obtained to the treatments commonly employed in the art, i.e., homogenization, sterilization, homogenization (rehomogenization), cooling and aging. In the preparation of the emulsion, as described above, a manner which comprises mixing the oily components and the aqueous components, respectively, in respective systems and then mixing them together, may be employed. Alternatively, another manner which comprises mixing all the components in a single system from the beginning, may be employed. The emulsion is prepared in such a manner as to adjust the contents of the oily phase and the aqueous phase respectively to 3 to 50% by weight and preferably 15 to 40% by weight, and 50 to 97% by weight and preferably 60 to 85% by weight, based on the total weight of the emulsion.

From the viewpoint of the whipping characteristics, etc., the foamable oil-in-water emulsion thus obtained according to the present invention has a viscosity of preferably from 200 to 3,000 cp (centipoise) and still more preferably from 200 to 1,000 cp at 20° C.

Because a specific glycerol di(saturated fatty acid) ester is contained in the foamable oil-in-water emulsion of the present invention, the cream prepared by whipping the emulsion exhibits a good heat resistance and is also excellent in melting behavior in mouth. Accordingly, the use of the foamable oil-in-water emulsion of the present invention makes it possible to give a filling or topping cream having excellent qualities which cannot be achieved by using the conventional products.

Other features of the invention will become apparent in the course of the following descriptions of exemplary embodiments which are given for illustration of the invention and are not intended to be limiting thereof.

DESCRIPTION OF THE PREFERRED EMBODIMENT

Unless otherwise specified, all parts given in the following examples are parts by weight.

Preparation of Glycerol di(Saturated Fatty Acid) Ester (Sample 1)

To 1,000 g of extremely hardened high-erucic acid rapeseed oil were added 330 g of glycerol and 1.5 g of calcium hydroxide. The resulting mixture was stirred under a nitrogen gas stream at 235° C. for 1 hour to thereby effect glycerolysis. Then, the resulting reaction mixture was subjected to steam distillation to remove the unreacted glycerol therefrom. Mono-glycerides were further removed from the mixture thus obtained by using a thin film molecular distillation apparatus to thereby give a product comprising the diglyceride as the main component.

This product was further purified in a conventional manner. That is, to this product, 2% by weight, based on the weight of the product, of activated clay was added. Then, the mixture thus obtained was left under conditions of 10 Torr and 105° C. for 30 minutes to decolor the product. After decoloring, the activated clay was removed from the mixture to give a decolored product. This decolored product was subjected to steam distillation in a vacuum of 2 to 3 Torr at 220° C. for 2 hours to thereby deodorize.

Thus, 420 g of a glycerol di(saturated fatty acid) ester (sample 1) comprising behenic acid moiety as the main constituting fatty acid moiety was obtained.

Preparation of Glycerol di(Saturated Fatty Acid) Ester (Sample 2)

To a mixture comprising 500 g of stearic acid (purity: 98% by weight) and 500 g of palmitic acid (purity: 98% by weight), 330 g of glycerol were added. The resulting mixture was stirred under a nitrogen gas stream at 235° C. for 3 hours to thereby effect esterification. The resulting reaction mixture was subjected to steam distillation to remove the unreacted glycerol therefrom. Monoglycerides were further removed from the mixture thus obtained by using a thin film molecular distillation apparatus to thereby give a product comprising the diglyceride as the main component. This product was purified by the conventional manner described above. Thus, 390 g of a glycerol di(saturated fatty acid) ester (sample 2) comprising stearic acid moiety and palmitic acid moiety as the main constituting fatty acid moieties was obtained.

Preparation of Glycerol di(Saturated Fatty Acid) Ester (Sample 3)

To a mixture comprising 650 g of ethyl behenate (purity: 88% by weight), 350 g of ethyl laurate (purity: 98% by weight) and 150 g of glycerol was added 100 g of a prepared lipase (Lipozyme 3A, manufactured by Novo Industri AS). The resulting mixture was stirred at 70° C. at 220 Torr for 3 hours to thereby effect transesterification. Next, the reaction mixture thus obtained was passed through a thin film molecular distillation apparatus, and then purified by the conventional manner described above. Thus, 780 g of a glycerol di(saturated fatty acid) ester (sample 3) comprising behenic acid moiety and lauric acid moiety as the main constituting fatty acid moieties was obtained.

Table 1 shows the glyceride compositions and the fatty acid moiety compositions of the glycerol di(saturated fatty acid) esters (samples 1 to 3) obtained above. Table 1 also shows the glyceride compositions and the fatty acid moiety compositions of extremely hardened palm oil (comparative sample 1) and extremely hardened soybean oil (comparative sample 2). Each composition is expressed in "% by weight".

TABLE 1

|  | Sample | | | Comp. sample | |
| --- | --- | --- | --- | --- | --- |
|  | 1 | 2 | 3 | 1 | 2 |
| Glyceride composition | | | | | |
| monoglyceride | 4.3 | 3.2 | 1.0 | 0.1 | 0.0 |
| diglyceride | 88.9 | 87.1 | 88.7 | 4.5 | 0.6 |
| triglyceride | 6.8 | 9.7 | 10.3 | 95.5 | 99.4 |
| fatty acid moiety composition | | | | | |
| lauric acid ($C_{12}$) mioety | 0.0 | 0.0 | 34.6 | 0.1 | 0.0 |
| myristic acid ($C_{14}$) moiety | 0.0 | 0.5 | 0.3 | 1.3 | 0.1 |
| palmitic acid ($C_{16}$) moiety | 4.1 | 48.2 | 0.0 | 44.1 | 11.2 |
| stearic acid ($C_{18}$) moiety | 32.5 | 49.9 | 2.5 | 53.5 | 86.4 |
| arachidic acid ($C_{20}$) moiety | 8.6 | 0.4 | 4.1 | 0.3 | 0.4 |
| behenic acid ($C_{22}$) moiety | 52.7 | 0.0 | 57.0 | 0.0 | 0.3 |
| others | 2.1 | 1.0 | 1.5 | 0.7 | 0.6 |

EXAMPLE 1

By using the sample 1 obtained above, a foamable oil-in-water emulsion of the following formulation was prepared in the manner which will be described below.

Formulation of Foamable Oil-in-Water Emulsion

| Oily phase: | |
| --- | --- |
| hardened palm kernel oil (iodine value: 2) | 22.0 |
| sample 1 | 3.0 |
| stearic acid monoglyceride | 0.2 |
| soybean lecithin (marketed soybean lecithin) | 0.3 |
| Aqueous phase: | |
| glucose | 20.0 |
| maltose | 20.0 |
| sodium caseinate | 0.5 |
| skimmilk powder | 5.0 |
| xanthan gum | 0.1 |
| sodium hexametaphosphate | 0.1 |
| sucrose fatty acid ester (HLB: 11) | 0.5 |
| water | 28.3 |
| total | 100.0(parts) |

Preparation Method

Components constituting the oily phase were mixed each other to prepare an oily solution, and components constituting the aqueous phase were mixed each other to prepare an aqueous solution. Next, the oily solution and the aqueous solution was mixed each other to pre-emulsify. The pre-emulsified product thus obtained was homogenized (30 kg/cm$^2$) with a homogenizer at 65° C. Next, the resulting emulsion was sterilized (145° C., 2 seconds) with an UHT pasteurizer (manufactured by Iwai Kikai Kogyo K.K.). Then, the emulsion was re-homogenized (30 to 45 kg/cm$^2$) with a homogenizer at 70° C. under aspetic conditions. The obtained emulsion was cooled to 15° C., and then packed in a container. The emulsion was aged (i.e., left to stand) at about 5° C. over day and night. Thus, a foamable oil-in-water emulsion I according to the present invention was prepared.

EXAMPLES 2 AND 3 AND COMPARATIVE EXAMPLES 1 AND 2

The same procedure of Example 1 was repeated except that each of the samples 2 and 3 obtained above and the comparative samples 1 and 2 was used as a substitute for the sample 1 in the oily phase. Thus, foamable oil-in-water emulsions II, III, a and b, which are respectively corresponding thereto, were prepared.

Evaluation of Foamable Oil-in-Water Emulsions

Each foamable oil-in-water emulsion thus obtained was whipped up to give a whipped cream, which was then evaluated in (1) heat resistance and (2) melting behavior in mouth (feeling during eating) according to the following manners. Table 2 summarizes the results.

Evaluation Method (1) Heat Resistance

Whipped creams thus obtained were storaged in an atmosphere of 30° C. for 48 hours. Each of the whipped creams was observed with respect to the shape before and after the storage, and separation of water after the storage. The heat resistance of the whipped creams were evaluated in accordance with the following criteria.

A: Neither loss in shape nor separation of water is observed.

B: Little loss in shape and little separation of water are observed.

C: Loss in shape and separation of water are partly observed, though each to the permissible extent.

D: Loss in shape is wholly observed and considerable separation of water is observed.

E: No shape is retained and serious separation of water occurs, which makes the product commercially worthless.

(2) Melting Behavior in Mouth (Feeling During Eating)

The melting behavior in mouth (feeling during eating) of each whipped cream was evaluated by skilled panelists in accordance with the following criteria via a sensory test.

A: Melting behavior in mouth is very excellent.

B: Melting behavior in mouth is somewhat excellent.

C: Melting behavior in mouth is moderate.

D: Melting behavior in mouth is somewhat poor.

E: Melting behavior in mouth is very poor.

TABLE 2

| Oil-in-water emulsion | Heat resistance | Melting behavoir in mouth |
|---|---|---|
| I (Ex. 1) | A | A |
| II (Ex. 2) | A | B |
| III (Ex. 3) | B | A |
| a (Comp. Ex. 1) | D | C |
| b (Comp. Ex. 2) | C | D |

The results given in the above Table 2 clearly indicate that the foamable oil-in-water emulsions I to III according to the present invention (Examples 1 to 3), each containing a glycerol di(saturated fatty acid) ester having a specific saturated fatty acid moiety, are excellent both in heat resistance and melting behavior in mouth after whipping thereof. In contrast, the foamable oil-in-water emulsions a and b (Comparative Examples 1 and 2), which are each prepared by adding extremely hardened palm oil (comparative sample 1) or extremely hardened soybean oil (comparative sample 2), are not satisfactory in both heat resistance and melting behavior in mouth.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent is:

1. A foamable oil-in-water emulsion having a viscosity of from 200 to 3,000 cP at 20° C., which provides a whip cream having improved heat resistance and melting behavior in the mouth, comprising (a) a triglyceride, (b) a glycerol di(saturated fatty acid) ester of the formula:

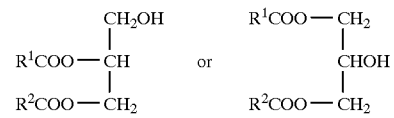

where $R^1COO-$ and $R^2COO-$ are the same or different from each other and each represents a saturated $C_{12-22}$ fatty acid moiety, (c) a protein, (d) an emulsifier, (e) water and (f) at least one member selected from the group consisting of a sugar and a sugar alcohol, the emulsion comprising an oily phase and an aqueous phase, the oily phase being from 3 to 50% by weight of the total weight of the emulsion and the aqueous phase being from 50 to 97% by weight of the total weight of the emulsion, the oily phase comprising (a) the triglyceride and from 1 to 50% by weight, based on the total weight of the oil phase, of (b) the glycerol di(saturated fatty acid) ester, and the aqueous phase comprising 10% by weight or more based on the total weight of the aqueous phase, of (f) at least one member selected from the group consisting of a sugar and a sugar alcohol;

wherein a portion of the $R^1COO-$(s) and the $R^2COO-$(s) constituting the glycerol di(saturated fatty acid) ester(s) moiety is selected from the group consisting of behenic acid, which is present is an amount of 50% by weight or more and less than 100% by weight based on the entire saturated fatty acid moieties.

2. A foamable oil-in-water emulsion having a viscosity of from 200 to 3,000 cP at 20° C., which provides a whip cream having improved heat resistance and melting behavior in the mouth, comprising (a) a triglyceride, (b) a glycerol di(saturated fatty acid) ester of the formula:

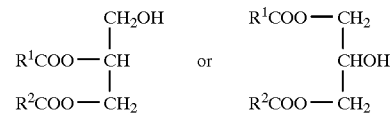

where $R^1COO-$ and $R^2COO-$ are the same or different from each other and each represents a saturated $C_{12-22}$ fatty acid moiety, (c) a protein, (d) an emulsifier, (e) water and (f) at least one member selected from the group consisting of a sugar and a sugar alcohol, the emulsion comprising an oily phase and an aqueous phase, the oily phase being from 3 to 50% by weight of the total weight of the emulsion and the aqueous phase being from 50 to 97% by weight of the total weight of the emulsion, the oily phase comprising (a) the triglyceride and from 1 to 50% by weight, based on the total weight of the oil phase, of (b) the glycerol di(saturated fatty acid) ester, and the aqueous phase comprising 10% by weight or more based on the total weight of the aqueous phase, of (f) at least one member selected from the group consisting of a sugar and a sugar alcohol;

wherein a portion of the $R^1COO-$(s) and the $R^2COO-$(s) constituting the glycerol di(saturated fatty acid)

ester(s) used is a saturated fatty acid moiety(s) selected from the group consisting of palmitic acid moiety, stearic acid moiety, arachidic acid moiety and behenic acid moiety, which is present in an amount of 60% by weight or more and less than 100% by weight based on the entire saturated fatty acid moieties.

3. The foamable oil-in-water emulsion as set forth in claim 1 or 2, in which the glycerol di(saturated fatty acid) ester is glycerol di(behenic acid) ester.

4. The foamable oil-in-water emulsion as set forth in claim 2, in which a part of the $R^1COO$—(s) and the $R^2COO$—(s) constituting the glycerol di(saturated fatty acid) ester(s) used is behenic acid moiety, which is present in an amount of 50% by weight or more and less than 100% by weight based on the entire saturated fatty acid moieties.

5. The foamable oil-in-water emulsion as set forth in claim 1 or 2, which comprises, based on the total weight of the aqueous phase, from 10 to 50% by weight of at least one member selected from the group consisting of a sugar and a sugar alcohol.

6. The foamable oil-in-water as set forth in claim 1 or 2, wherein said emulsifier is used in an amount of from about 0.1 to 1.0% by weight based on the total weight of the emulsion.

7. The foamable oil-in-water as set forth in claim 1 or 2, wherein said emulsifier is selected from the group consisting of monoglycerides of citric acid and lactic acid; glycerol fatty acid esters, polyglycerol fatty acid esters, sucrose fatty acid esters, sorbitan fatty acid esters, lecithins and propyleneglycol fatty acid esters.

8. The foamable oil-in-water emulsion as set forth in claim 1 or 2, wherein said protein is selected form the group consisting of casein whey protein, skim milk powder, whole milk powder, milk protein, soybean protein and milk protein salts.

9. The foamable oil-in-water emulsion as set forth in claim 1 or 2, wherein said sugar is selected from the group consisting of glucose, lactose, maltose and sucrose.

10. The foamable oil-in-water emulsion as set forth in claim 1 or 2 wherein said sugar alcohol is selected from the group consisting of sorbitol, maltitol, mannitol and xylitol.

11. The foamable oil-in-water emulsion as set forth in claim 1 or 2, which further contains a stabilizer.

12. The foamable oil-in-water emulsion as set forth in claim 1 or 2, which further comprises a flavor selected from the group consisting of milk and vanillin.

* * * * *